(12) United States Patent
Mehrotra et al.

(10) Patent No.: US 11,556,828 B2
(45) Date of Patent: Jan. 17, 2023

(54) SYSTEMS AND METHODS FOR SELECTING CONTENT USING A MULTIPLE OBJECTIVE, MULTI-ARM BANDIT MODEL

(71) Applicant: Spotify AB, Stockholm (SE)

(72) Inventors: Rishabh Mehrotra, London (GB); Niannan Xue, London (GB); Mounia Lalmas-Roelleke, London (GB)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/170,543

(22) Filed: Feb. 8, 2021

(65) Prior Publication Data

US 2022/0019922 A1 Jan. 20, 2022

Related U.S. Application Data

(60) Provisional application No. 63/052,845, filed on Jul. 16, 2020.

(51) Int. Cl.
| | | |
|---|---|---|
| *G06F 3/048* | (2013.01) | |
| *G06N 7/00* | (2006.01) | |
| *G06F 9/451* | (2018.01) | |
| *G06F 3/0482* | (2013.01) | |

(52) U.S. Cl.
CPC ........... *G06N 7/005* (2013.01); *G06F 3/0482* (2013.01); *G06F 9/451* (2018.02)

(58) Field of Classification Search
CPC .... G06F 3/0482; G06F 16/639; G06F 16/683; G06F 9/451; G06N 3/08; G06N 5/02; G06N 7/005; G06N 20/00; G06Q 30/02; G06Q 30/0276; G06Q 30/06; G06Q 30/0601; G06Q 30/0631
See application file for complete search history.

(56) References Cited

U.S. PATENT DOCUMENTS

| | | | | |
|---|---|---|---|---|
| 11,004,135 | B1* | 5/2021 | Sandler | G06Q 30/0631 |
| 11,113,745 | B1* | 9/2021 | Cetintas | G06Q 30/0282 |
| 2004/0019598 | A1* | 1/2004 | Huang | G16H 50/70 |
| 2006/0112044 | A1* | 5/2006 | Le Huede | G06F 17/18 |
| | | | | 706/46 |
| 2012/0030159 | A1* | 2/2012 | Pilaszy | G06F 16/951 |
| | | | | 706/46 |
| 2015/0356447 | A1* | 12/2015 | Lowe | G06F 16/68 |
| | | | | 706/47 |

* cited by examiner

*Primary Examiner* — Claudia Dragoescu
(74) *Attorney, Agent, or Firm* — Morgan, Lewis & Bockius LLP

(57) ABSTRACT

An electronic device for a first session of a user, for each of a plurality of lists of media content items, determines a respective value for each objective of a first set of objectives and a second set of objectives by accessing contextual data for the first session of the user. The first set of objectives corresponds to the user and the second set of objectives corresponds to a second party distinct from the user. The electronic device, using a multi-arm bandit model, identifies a first list of media content items, from the plurality of lists of media content items, to present to the user, including: calculating a score for each list in the plurality of lists of media items; and probabilistically selecting the first list of media content items according to the respective scores corresponding to the respective lists in the plurality of lists of media items.

20 Claims, 6 Drawing Sheets

SYSTEMS AND METHODS FOR SELECTING CONTENT USING A MULTIPLE OBJECTIVE, MULTI-ARM BANDIT MODEL

RELATED APPLICATIONS

This application claims priority to U.S. Provisional Application No. 63/052,845, filed Jul. 16, 2020, entitled "Systems and Methods for Selecting Content Using a Multiple Objective, Multi-Arm Bandit Model," which is hereby incorporated in its entirety.

TECHNICAL FIELD

The disclosed embodiments relate generally to media playback, and, in particular, to selecting media content for a user based in part on user objectives using a multi-arm bandit model.

BACKGROUND

Access to electronic media, such as music and video content, has expanded dramatically over time. As a departure from physical media, media content providers stream media to electronic devices across wireless networks, improving the convenience with which users can digest and experience such content.

Media content providers provide recommendations of content to users. Media content providers collect data related to their users in order to provide better and more personalized recommendations.

SUMMARY

There is a need for systems and methods of choosing media content items, such as a playlist of media content items, to recommend to a user based on user preferences as well as the preferences of one or more third-parties. For example, the user has distinct objectives from a third-party, such as the objectives of the media content provider. By using a multi-arm bandit model to select the media content item for the user, a media providing service provides better recommendations that balance the objectives between multiple parties. To that end, the multi-arm bandit model is designed to calculate a probability distribution using information about the user, such as contextual information and historical information about the user's previous consumption of media content.

In accordance with some embodiments, a method is performed at a first electronic device. The first electronic device has one or more processors and memory storing instructions for execution by the one or more processors. The method includes, for a first session of a user, for each of a plurality of lists of media content items, determining a respective value for each objective of a first set of objectives and a second set of objectives by accessing contextual data for the first session of the user (e.g., determining a vector of values for the first set of objectives and the second set of objectives, each value corresponding to a respective objective of the first set of objectives or the second set of objectives). The first set of objectives corresponds to the user and the second set of objectives corresponds to a second party distinct from the user. The method includes, using a multi-arm bandit model, identifying a first list of media content items, from the plurality of lists of media content items, to present to the user, including: calculating a score for each list in the plurality of lists of media items using the respective value for each objective of the first set of objectives and the second set of objectives (e.g., by applying an aggregation function to the vector) and probabilistically selecting (e.g., probabilistically sampling) the first list of media content items according to the respective scores corresponding to the respective lists in the plurality of lists of media items. The method further includes updating a user interface of a second electronic device, associated with the user, to present the first list of media content items to the user.

In accordance with some embodiments, a first electronic device (e.g., a server system, a client device, etc.) includes one or more processors and memory storing one or more programs configured to be executed by the one or more processors. The one or more programs include instructions for, for a first session of a user, for each of a plurality of lists of media content items, determining a respective value for each objective of a first set of objectives and a second set of objectives by accessing contextual data for the first session of the user (e.g., determining a vector of values for the first set of objectives and the second set of objectives, each value corresponding to a respective objective of the first set of objectives or the second set of objectives). The first set of objectives corresponds to the user and the second set of objectives corresponds to a second party distinct from the user. The one or more programs include instructions for, using a multi-arm bandit model, identifying a first list of media content items, from the plurality of lists of media content items, to present to the user, including: calculating a score for each list in the plurality of lists of media items using the respective value for each objective of the first set of objectives and the second set of objectives (e.g., by applying an aggregation function to the vector) and probabilistically selecting (e.g., probabilistically sampling) the first list of media content items according to the respective scores corresponding to the respective lists in the plurality of lists of media items. The one or more programs further include instructions for updating a user interface of a second electronic device, associated with the user, to present the first list of media content items to the user.

In accordance with some embodiments, a computer-readable storage medium has stored therein instructions that, when executed by an electronic device, cause the first electronic device to, for a first session of a user, for each of a plurality of lists of media content items, determine a respective value for each objective of a first set of objectives and a second set of objectives by accessing contextual data for the first session of the user (e.g., determine a vector of values for the first set of objectives and the second set of objectives, each value corresponding to a respective objective of the first set of objectives or the second set of objectives). The first set of objectives corresponds to the user and the second set of objectives corresponds to a second party distinct from the user. The instructions further cause the first electronic device to, using a multi-arm bandit model, identify a first list of media content items, from the plurality of lists of media content items, to present to the user, including: calculating a score for each list in the plurality of lists of media items using the respective value for each objective of the first set of objectives and the second set of objectives (e.g., by applying an aggregation function to the vector) and probabilistically selecting (probabilistically sampling) the first list of media content items according to the respective scores corresponding to the respective lists in the plurality of lists of media items. The instructions further cause the first electronic device to update a user interface of a second electronic device, associated with the user, to present the first list of media content items to the user.

Thus, systems are provided with improved methods for identifying and providing a user with a recommended list of media content items.

BRIEF DESCRIPTION OF THE DRAWINGS

The embodiments disclosed herein are illustrated by way of example, and not by way of limitation, in the figures of the accompanying drawings. Like reference numerals refer to corresponding parts throughout the drawings and specification.

DETAILED DESCRIPTION

Figure 1:
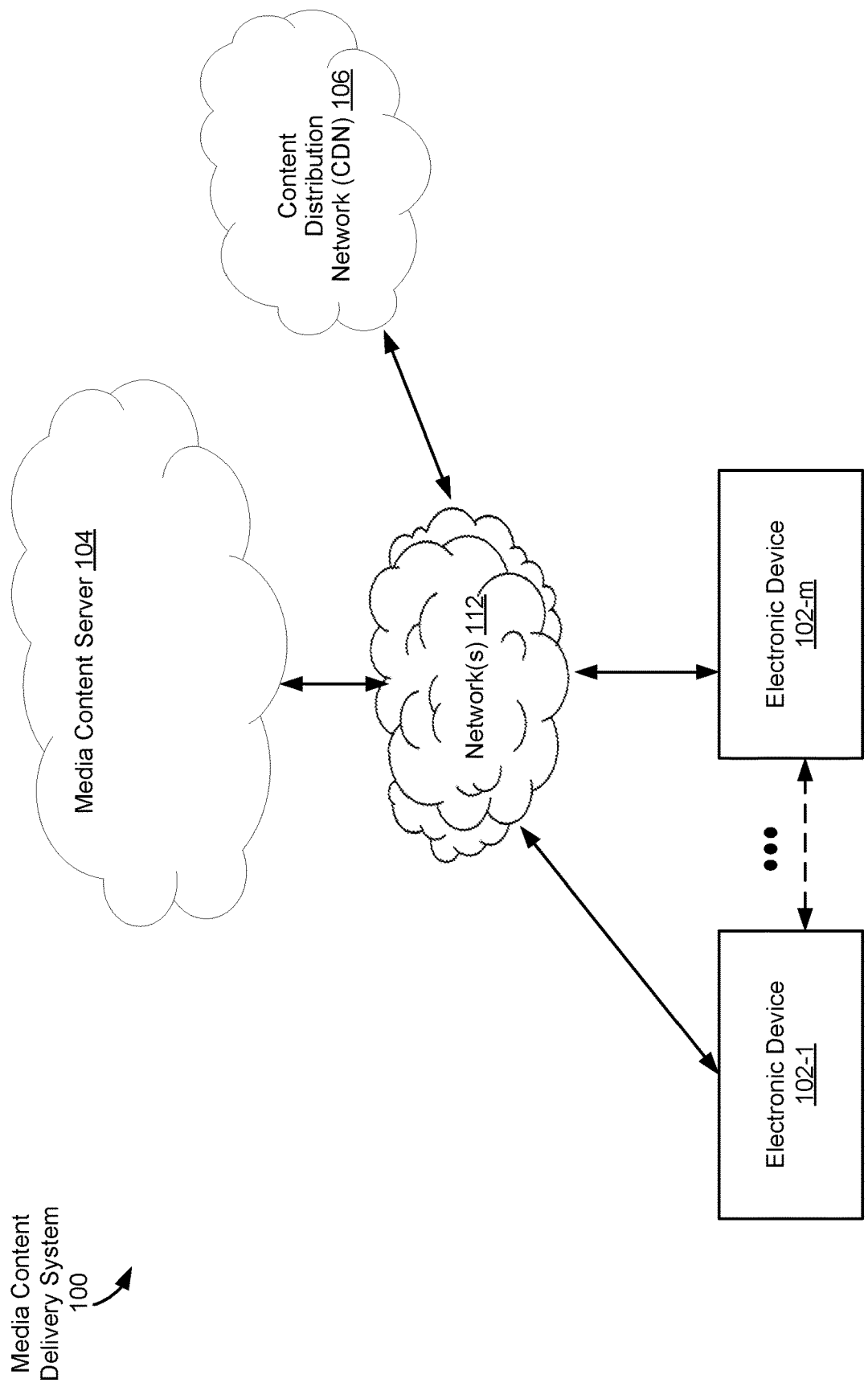
FIG. 1 is a block diagram illustrating a media content delivery system, in accordance with some embodiments.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electronic device could be termed a second electronic device, and, similarly, a second electronic device could be termed a first electronic device, without departing from the scope of the various described embodiments. The first electronic device and the second electronic device are both electronic devices, but they are not the same electronic device.

The terminology used in the description of the various embodiments described herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

In some embodiments, a system for generating recommendations based on multiple objectives of multiple stakeholders is provided. In some embodiments, the system uses a multi-armed bandit model. In some embodiments, the multi-armed bandit model observes contextual information for each round to better predict the expected arm rewards in that round (e.g., as compared to classical multi-arm bandit models). In some embodiments, the reward observed for each arm is a function of contextual information for a plurality of objectives (e.g., instead of a single objective). More specifically, the system generates a vector of values for each objective of a first set of objectives (corresponding to the user) and a second set of objectives (corresponding to a party other than the user). The reward (e.g., a score) for each arm is determined by using an aggregation function (e.g., a Gini function) to aggregate the values from the two vectors. In some embodiments, the multi-armed bandit model probabilistically selects (e.g., probabilistically samples) the arm (e.g., for the round) based on the reward. In some embodiments, each arm represents a list of media items (e.g., a playlist). In some embodiments, the probability distribution function is calculated to minimize a cumulative cost for each objective (of the plurality of objectives) in order to balance the different (e.g., conflicting) objectives.

For example, the plurality of objectives correspond to distinct parties, such as user objectives representing user satisfaction for a user of a media-providing service, provider objectives for the media-providing service, and/or promotional objectives of a third-party (e.g., advertiser), as described with reference to FIG. 4. In some embodiments, the model considers (e.g., optimizes) a plurality of objectives for a respective party (e.g., a plurality of objectives for a user) simultaneously (rather than optimizing for each objective individually). Similarly, in some embodiments, the model optimizes a plurality of objectives for each respective party of a plurality of distinct parties.

FIG. 1 is a block diagram illustrating a media content delivery system 100, in accordance with some embodiments. The media content delivery system 100 includes one or more electronic devices 102 (e.g., electronic device 102-1 to electronic device 102-$m$, where m is an integer greater than one), one or more media content servers 104, and/or one or more content distribution networks (CDNs) 106. The one or more media content servers 104 are associated with (e.g., at least partially compose) a media-providing service. The one or more CDNs 106 store and/or provide one or more content items (e.g., to electronic devices 102). In some embodiments, the CDNs 106 are included in the media content servers 104. One or more networks 112 communicably couple the components of the media content delivery system 100. In some embodiments, the one or more networks 112 include public communication networks, private communication networks, or a combination of both public and private communication networks. For example, the one or more networks 112 can be any network (or combination of networks) such as the Internet, other wide area networks (WAN), local area networks (LAN), virtual private networks (VPN), metropolitan area networks (MAN), peer-to-peer networks, and/or ad-hoc connections.

In some embodiments, an electronic device 102 is associated with one or more users. In some embodiments, an electronic device 102 is a personal computer, mobile electronic device, wearable computing device, laptop computer, tablet computer, mobile phone, feature phone, smart phone, digital media player, a speaker, television (TV), digital versatile disk (DVD) player, and/or any other electronic device capable of presenting media content (e.g., controlling playback of media items, such as music tracks, videos, etc.). Electronic devices 102 may connect to each other wirelessly and/or through a wired connection (e.g., directly through an interface, such as an HDMI interface). In some embodiments, an electronic device 102 is a headless client. In some embodiments, electronic devices 102-1 and 102-m are the same type of device (e.g., electronic device 102-1 and electronic device 102-m are both speakers). Alternatively, electronic device 102-1 and electronic device 102-m include two or more different types of devices.

In some embodiments, electronic devices 102-1 and 102-m send and receive media-control information through network(s) 112. For example, electronic devices 102-1 and 102-m send media control requests (e.g., requests to play music, movies, videos, or other media items, or playlists thereof) to media content server 104 through network(s) 112. Additionally, electronic devices 102-1 and 102-m, in some embodiments, also send indications of media content items to media content server 104 through network(s) 112. In some embodiments, the media content items are uploaded to electronic devices 102-1 and 102-m before the electronic devices forward the media content items to media content server 104.

In some embodiments, electronic device 102-1 communicates directly with electronic device 102-m (e.g., as illustrated by the dotted-line arrow), or any other electronic device 102. As illustrated in FIG. 1, electronic device 102-1 is able to communicate directly (e.g., through a wired connection and/or through a short-range wireless signal, such as those associated with personal-area-network (e.g., BLUETOOTH/BLE) communication technologies, radio-frequency-based near-field communication technologies, infrared communication technologies, etc.) with electronic device 102-m. In some embodiments, electronic device 102-1 communicates with electronic device 102-m through network(s) 112. In some embodiments, electronic device 102-1 uses the direct connection with electronic device 102-m to stream content (e.g., data for media items) for playback on the electronic device 102-m.

In some embodiments, electronic device 102-1 and/or electronic device 102-m include a media application 222 (FIG. 2) that allows a respective user of the respective electronic device to upload (e.g., to media content server 104), browse, request (e.g., for playback at the electronic device 102), and/or present media content (e.g., control playback of music tracks, videos, etc.). In some embodiments, one or more media content items are stored locally by an electronic device 102 (e.g., in memory 212 of the electronic device 102, FIG. 2). In some embodiments, one or more media content items are received by an electronic device 102 in a data stream (e.g., from the CDN 106 and/or from the media content server 104). The electronic device(s) 102 are capable of receiving media content (e.g., from the CDN 106) and presenting the received media content. For example, electronic device 102-1 may be a component of a network-connected audio/video system (e.g., a home entertainment system, a radio/alarm clock with a digital display, or an infotainment system of a vehicle). In some embodiments, the CDN 106 sends media content to the electronic device(s) 102.

In some embodiments, the CDN 106 stores and provides media content (e.g., media content requested by the media application 222 of electronic device 102) to electronic device 102 via the network(s) 112. Content (also referred to herein as "media items," "media content items," and "content items") is received, stored, and/or served by the CDN 106. In some embodiments, content includes audio (e.g., music, spoken word, podcasts, etc.), video (e.g., short-form videos, music videos, television shows, movies, clips, previews, etc.), text (e.g., articles, blog posts, emails, etc.), image data (e.g., image files, photographs, drawings, renderings, etc.), games (e.g., 2- or 3-dimensional graphics-based computer games, etc.), or any combination of content types (e.g., web pages that include any combination of the foregoing types of content or other content not explicitly listed). In some embodiments, content includes one or more audio media items (also referred to herein as "audio items," "tracks," and/or "audio tracks").

In some embodiments, media content server 104 receives media requests (e.g., commands) from electronic devices 102. In some embodiments, media content server 104 includes a voice API (e.g., voice recognition module 316, FIG. 3), a connect API, and/or key service (e.g., key database 336, FIG. 3). In some embodiments, media content server 104 validates (e.g., using key service) electronic devices 102 by exchanging one or more keys (e.g., tokens) with electronic device(s) 102.

In some embodiments, media content server 104 and/or CDN 106 stores one or more playlists (e.g., information indicating a set of media content items). For example, a playlist is a set of media content items defined by a user and/or defined by an editor associated with a media-providing service. The description of the media content server 104 as a "server" is intended as a functional description of the devices, systems, processor cores, and/or other components that provide the functionality attributed to the media content server 104. It will be understood that the media content server 104 may be a single server computer, or may be multiple server computers. Moreover, the media content server 104 may be coupled to CDN 106 and/or other servers and/or server systems, or other devices, such as other client devices, databases, content delivery networks (e.g., peer-to-peer networks), network caches, and the like. In some embodiments, the media content server 104 is implemented by multiple computing devices working together to perform the actions of a server system (e.g., cloud computing).

Figure 2:
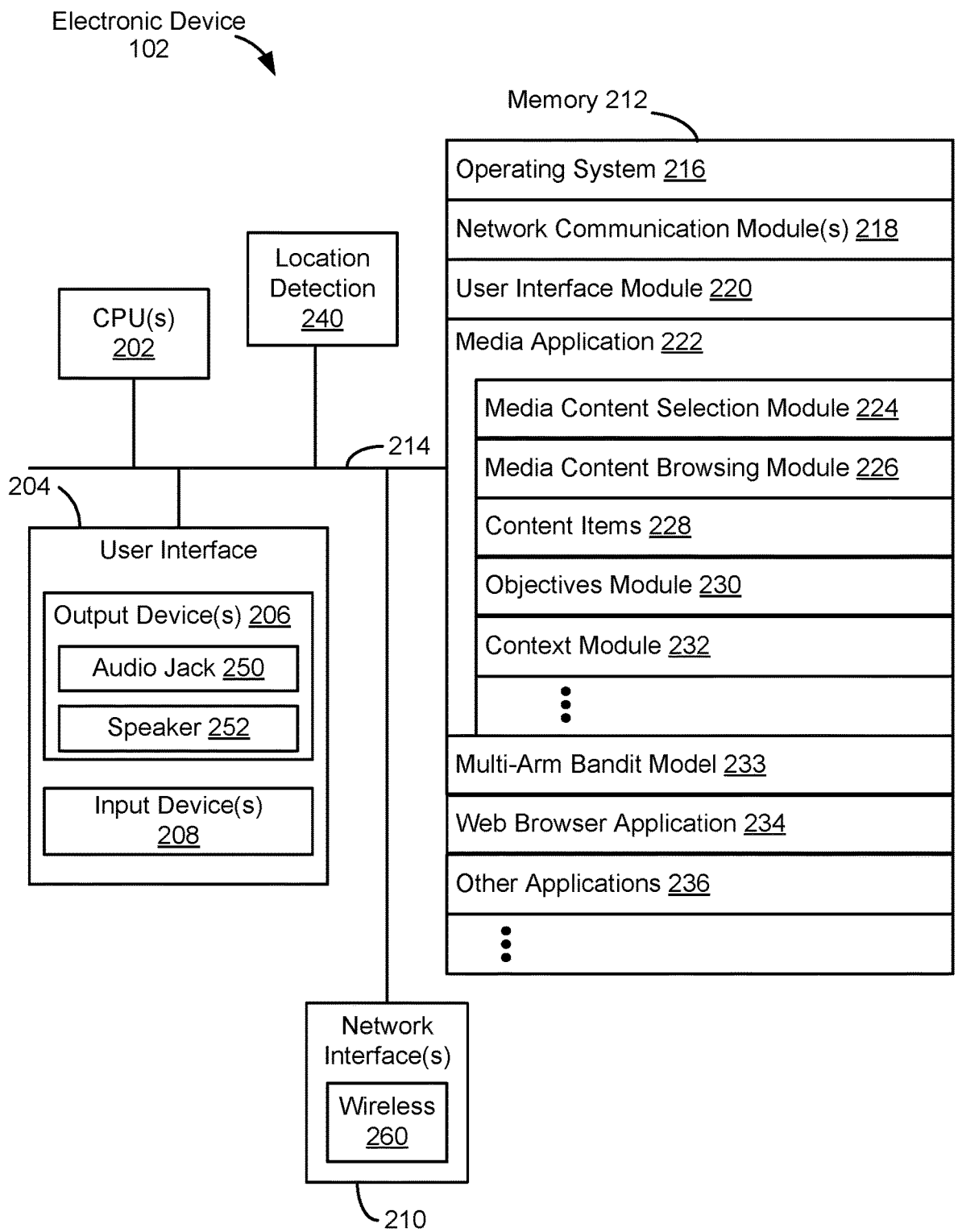
FIG. 2 is a block diagram illustrating a client device, in accordance with some embodiments.

FIG. 2 is a block diagram illustrating an electronic device 102 (e.g., electronic device 102-1 and/or electronic device 102-m, FIG. 1), in accordance with some embodiments. The electronic device 102 includes one or more central processing units (CPU(s), i.e., processors or cores) 202, one or more network (or other communications) interfaces 210, memory 212, and one or more communication buses 214 for interconnecting these components. The communication buses 214 optionally include circuitry (sometimes called a chipset) that interconnects and controls communications between system components.

In some embodiments, the electronic device 102 includes a user interface 204, including output device(s) 206 and/or input device(s) 208. In some embodiments, the input devices 208 include a keyboard, mouse, or track pad. Alternatively, or in addition, in some embodiments, the user interface 204 includes a display device that includes a touch-sensitive surface, in which case the display device is a touch-sensitive display. In electronic devices that have a touch-sensitive display, a physical keyboard is optional (e.g., a soft keyboard may be displayed when keyboard entry is needed). In some embodiments, the output devices (e.g., output device(s) 206) include a speaker 252 (e.g., speakerphone device) and/or an audio jack 250 (or other physical output connection port) for connecting to speakers, earphones, headphones, or other external listening devices. Furthermore, some electronic devices 102 use a microphone and voice recognition device to supplement or replace the keyboard. Optionally, the electronic device 102 includes an audio input device (e.g., a microphone) to capture audio (e.g., speech from a user).

Optionally, the electronic device 102 includes a location-detection device 240, such as a global navigation satellite system (GNSS) (e.g., GPS (global positioning system), GLONASS, Galileo, BeiDou) or other geo-location receiver, and/or location-detection software for determining the location of the electronic device 102 (e.g., module for finding a position of the electronic device 102 using trilateration of measured signal strengths for nearby devices).

In some embodiments, the one or more network interfaces 210 include wireless and/or wired interfaces for receiving data from and/or transmitting data to other electronic devices 102, a media content server 104, a CDN 106, and/or other devices or systems. In some embodiments, data communications are carried out using any of a variety of custom or standard wireless protocols (e.g., NFC, RFID, IEEE 802.15.4, Wi-Fi, ZigBee, 6LoWPAN, Thread, Z-Wave, Bluetooth, ISA100.11a, WirelessHART, MiWi, etc.). Furthermore, in some embodiments, data communications are carried out using any of a variety of custom or standard wired protocols (e.g., USB, Firewire, Ethernet, etc.). For example, the one or more network interfaces 210 include a wireless interface 260 for enabling wireless data communications with other electronic devices 102, media presentations systems 108, and/or or other wireless (e.g., Bluetooth-compatible) devices (e.g., for streaming audio data to the media presentations system 108 of an automobile). Furthermore, in some embodiments, the wireless interface 260 (or a different communications interface of the one or more network interfaces 210) enables data communications with other WLAN-compatible devices (e.g., a media presentations system 108) and/or the media content server 104 (via the one or more network(s) 112, FIG. 1).

In some embodiments, electronic device 102 includes one or more sensors including, but not limited to, accelerometers, gyroscopes, compasses, magnetometer, light sensors, near field communication transceivers, barometers, humidity sensors, temperature sensors, proximity sensors, range finders, and/or other sensors/devices for sensing and measuring various environmental conditions.

Memory 212 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. Memory 212 may optionally include one or more storage devices remotely located from the CPU(s) 202. Memory 212, or alternately, the non-volatile memory solid-state storage devices within memory 212, includes a non-transitory computer-readable storage medium. In some embodiments, memory 212 or the non-transitory computer-readable storage medium of memory 212 stores the following programs, modules, and data structures, or a subset or superset thereof:

an operating system 216 that includes procedures for handling various basic system services and for performing hardware-dependent tasks;

network communication module(s) 218 for connecting the client device 102 to other computing devices (e.g., media presentation system(s) 108, media content server 104, and/or other client devices) via the one or more network interface(s) 210 (wired or wireless) connected to one or more network(s) 112;

a user interface module 220 that receives commands and/or inputs from a user via the user interface 204 (e.g., from the input devices 208) and provides outputs for playback and/or display on the user interface 204 (e.g., the output devices 206);

a media application 222 (e.g., an application for accessing a media-providing service of a media content provider associated with media content server 104) for uploading, browsing, receiving, processing, presenting, and/or requesting playback of media (e.g., media items). In some embodiments, media application 222 includes a media player, a streaming media application, and/or any other appropriate application or component of an application. In some embodiments, media application 222 is used to monitor, store, and/or transmit (e.g., to media content server 104) data associated with user behavior. In some embodiments, media application 222 also includes the following modules (or sets of instructions), or a subset or superset thereof:

a media content selection module 224 for selecting one or more media content items and/or sending, to the media content server, an indication of the selected media content item(s);

a media content browsing module 226 for providing controls and/or user interfaces enabling a user to navigate, select for playback, and otherwise control or interact with media content, whether the media content is stored or played locally or remotely;

a content items module 228 for storing media items for playback and/or for forwarding requests for media content items to the media content server;

an objectives module 230 for determining and/or storing objectives from one or more parties, such as objectives of the user of the electronic device 102; and a context module 232 for determining current contextual information, such as from a playback history of a user, to be provided to a multi-arm bandit model;

a multi-arm bandit model 233 for calculating and/or updating a probability function based on objectives and context, and instructing media content selection module 224 to select a particular arm for each round;

a web browser application 234 for accessing, viewing, and interacting with web sites; and other applications 236, such as applications for word processing, calendaring, mapping, weather, stocks, time keeping, virtual digital assistant, presenting, number crunching (spreadsheets), drawing, instant messaging, e-mail, telephony, video conferencing, photo management, video management, a digital music player, a digital video player, 2D gaming, 3D (e.g., virtual reality) gaming, electronic book reader, and/or workout support.

Figure 3:
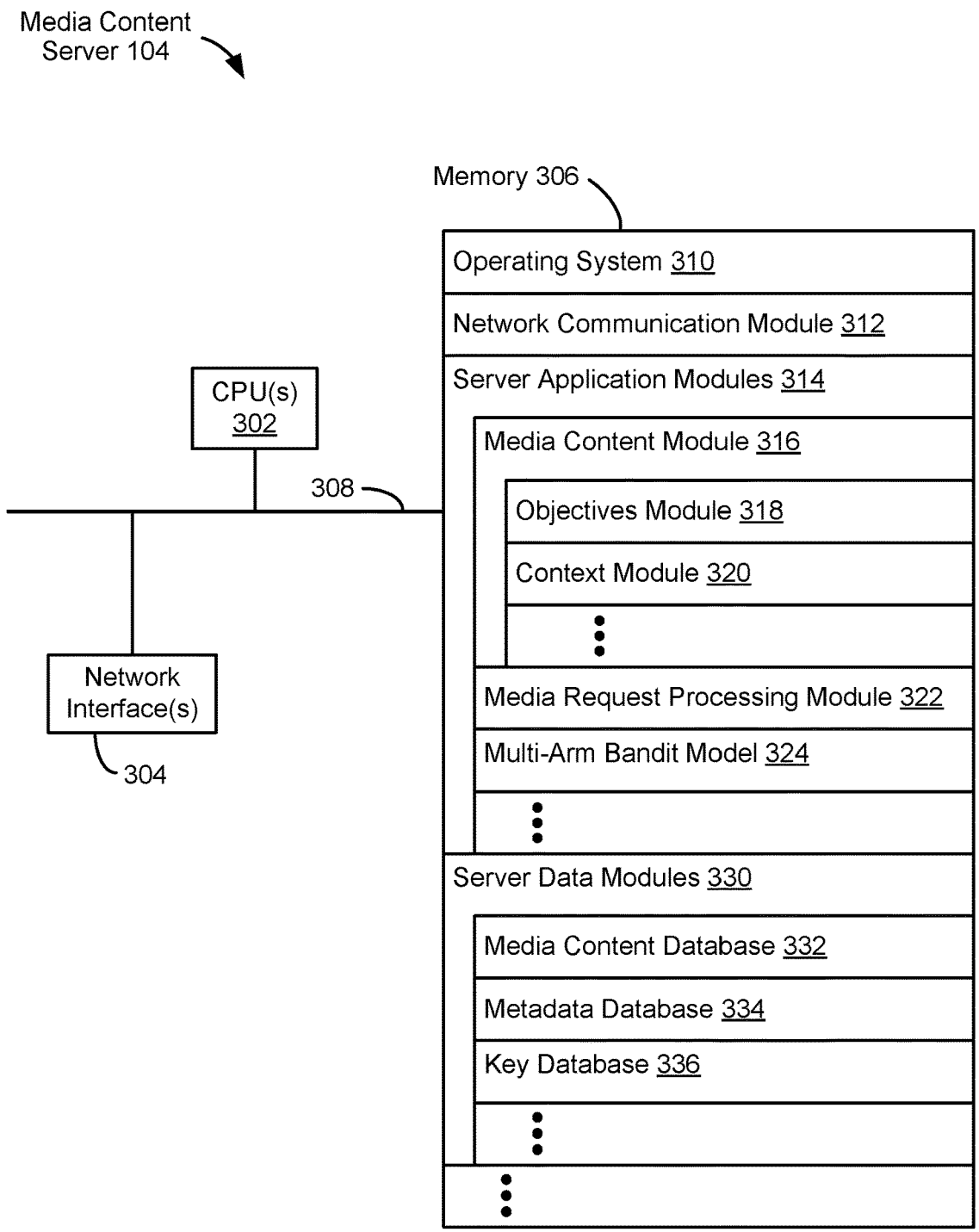
FIG. 3 is a block diagram illustrating a media content server, in accordance with some embodiments.

FIG. 3 is a block diagram illustrating a media content server 104, in accordance with some embodiments. The media content server 104 typically includes one or more central processing units/cores (CPUs) 302, one or more network interfaces 304, memory 306, and one or more communication buses 308 for interconnecting these components.

Memory 306 includes high-speed random access memory, such as DRAM, SRAM, DDR RAM, or other random access solid-state memory devices; and may include non-volatile memory, such as one or more magnetic disk storage devices, optical disk storage devices, flash memory devices, or other non-volatile solid-state storage devices. Memory 306 optionally includes one or more storage devices remotely located from one or more CPUs 302. Memory 306, or, alternatively, the non-volatile solid-state memory device(s) within memory 306, includes a non-transitory computer-readable storage medium. In some embodiments, memory 306, or the non-transitory computer-readable storage medium of memory 306, stores the following programs, modules and data structures, or a subset or superset thereof:

- an operating system 310 that includes procedures for handling various basic system services and for performing hardware-dependent tasks;
- a network communication module 312 that is used for connecting the media content server 104 to other computing devices via one or more network interfaces 304 (wired or wireless) connected to one or more networks 112;
- one or more server application modules 314 for performing various functions with respect to providing and managing a content service, the server application modules 314 including, but not limited to, one or more of:
  - a media content module 316 for storing one or more media content items and/or sending (e.g., streaming), to the electronic device, one or more requested media content item(s), including but not limited to, one or more of:
    - an objectives module 318 for determining and/or storing objectives from one or more parties; and
    - a context module 320 for determining current contextual information, such as from a playback history of a user and/or matching current contextual information to previously recorded contextual information, to be provided to a multi-arm bandit model; and
  - a media request processing module 322 for processing requests for media content and facilitating access to requested media items by client devices (e.g., the client device 102) including, optionally, streaming media content to such devices and/or to one or more media presentation system(s) 108;
  - a multi-arm bandit model 324 for calculating and/or updating a probability function based on objectives and context, and instructing media content selection module 224 to select a particular arm for each round;
- one or more server data module(s) 330 for handling the storage of and/or access to media items and/or metadata relating to the media items; in some embodiments, the one or more server data module(s) 330 include:
  - a media content database 332 for storing media items;
  - a metadata database 334 for storing metadata relating to the media items; and
  - a key database 336 for storing keys related to account information for user media accounts, such as user profiles, credentials (e.g., user identifiers, passwords, email addresses, etc.), and/or identifiers of any linked accounts.

In some embodiments, the media content server 104 includes web or Hypertext Transfer Protocol (HTTP) servers, File Transfer Protocol (FTP) servers, as well as web pages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), XHP, Javelin, Wireless Universal Resource File (WURFL), and the like.

Each of the above identified modules stored in memory 212 and 306 corresponds to a set of instructions for performing a function described herein. The above identified modules or programs (i.e., sets of instructions) need not be implemented as separate software programs, procedures, or modules, and thus various subsets of these modules may be combined or otherwise re-arranged in various embodiments. In some embodiments, memory 212 and 306 optionally store a subset or superset of the respective modules and data structures identified above. Furthermore, memory 212 and 306 optionally store additional modules and data structures not described above.

Although FIG. 3 illustrates the media content server 104 in accordance with some embodiments, FIG. 3 is intended more as a functional description of the various features that may be present in one or more media content servers than as a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. In some embodiments, media content database 332 and/or metadata database 334 are stored on devices (e.g., CDN 106) that are accessed by media content server 104. The actual number of servers used to implement the media content server 104, and how features are allocated among them, will vary from one implementation to another and, optionally, depends in part on the amount of data traffic that the server system handles during peak usage periods as well as during average usage periods.

A system is provided to jointly optimize for multiple metrics using a bandit model. The following is an exemplary use case of multi-objective modelling that motivates the need for a multi-objective modelling for recommender systems. The example is a specific use case of a global music streaming platform where users listen to music from different artists. The recommendation system recommends a set of tracks (i.e. playlists containing songs) to the user, each of which could come from different artists. Different sets have varying degree of relevance to user's interests, and users could be satisfied with the recommended set to varying extent.

Often in user centric systems, system designers have access to multiple implicit signals from the rich fine-grained user interaction information logged in behavior logs, which give rise to a number of user-centric objectives. For example, in a case of music streaming services, a system could optimize for clicks, streams, number of songs played or other user engagement metrics. Often, such metrics are correlated, and optimizing for one would inherently lead the model to improve other correlated metrics. However, this need not be true: an objective might be un-correlated or negatively correlated with user satisfaction metrics, and there exist strict trade-off in optimizing one against the other, for example, as described in more detail with reference to FIG. 4. Thus, there is a need for development of multi-objective models that optimize multiple metrics.

Specifically, for the case of music streaming platforms, system designers can optimize for a number of user centric objectives, such as clicks, track stream, number of tracks played, long duration streams, among others. Furthermore, when considering other stakeholders in a music streaming platform, additional objectives surface, including diversity centric and promotion centric objectives. In some embodiments, optimizing for some metrics might hurt other metrics. For example, promoting certain artists in a recommendation setting might annoy users whose taste profiles do not match the artist, and hence hurt user satisfaction metrics. To better understand this interplay between different objectives, given a random sample of user streaming data, the correlation between different user centric and third-party (e.g., artist) centric objectives is illustrated in FIG. 4. FIG. 4 illustrates three user centric objectives: duration of streamed songs (stream), clicks on playlists (clicks) and number of songs played. Additionally, FIG. 4 includes two artist and platform centric objectives. First, diversity (g) quantifies the gender diversity present in the recommended set, which is computed as the percentage tracks in a set whose main artist is a non-male artist. Second, promotion objective assumes a scenario wherein the platform intends to promote some niche artists to users via its recommendations. These diversity and promotional objectives find overlap with other corresponding metrics for other platforms, e.g. diversity and promotion of retailers (e-commerce platforms), funding campaigns (crowdfunding platforms), hosts, among others.

Figure 4:
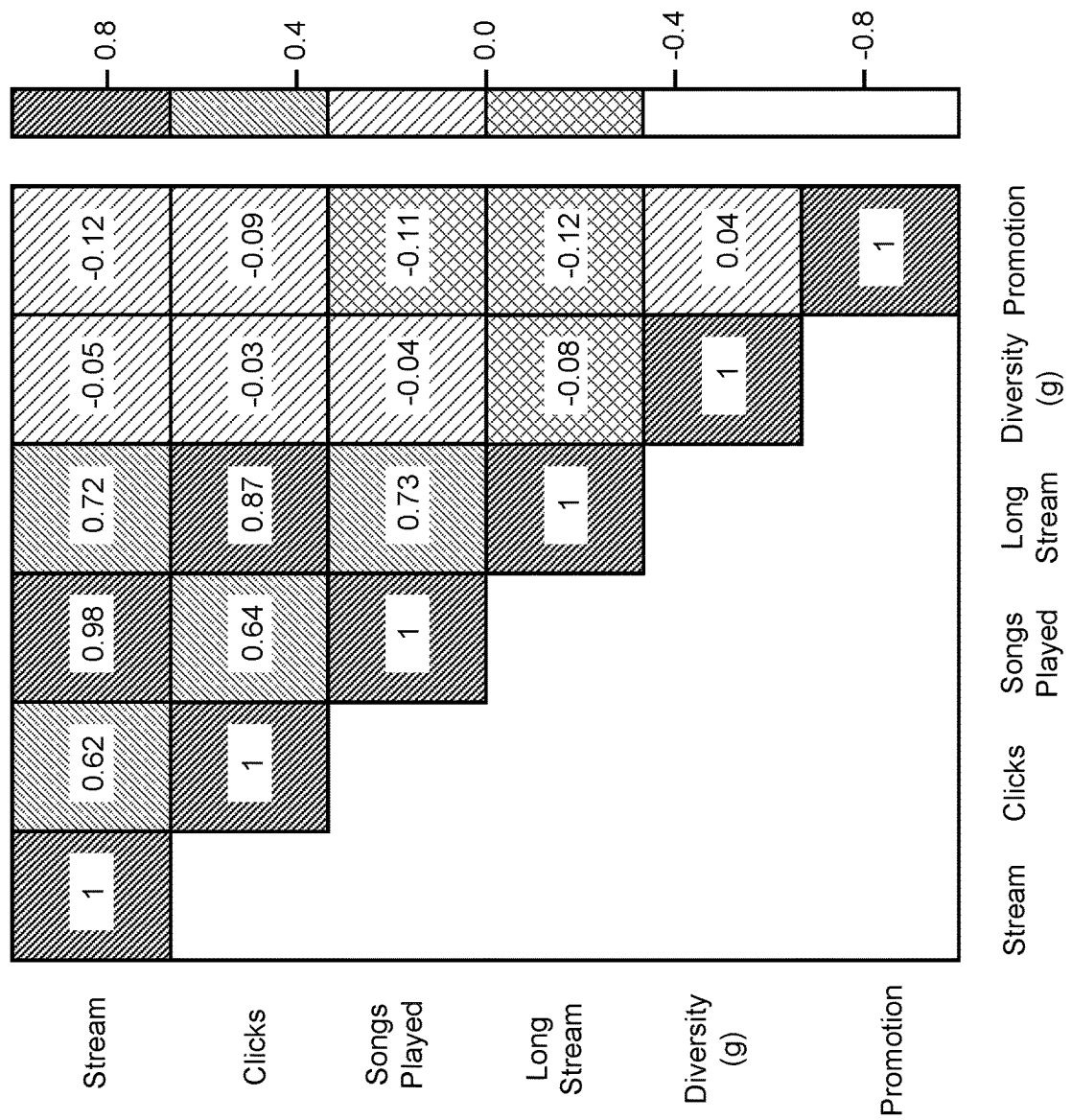
FIG. 4 is a block diagram illustrating a trade-off between a plurality of objectives, in accordance with some embodiments.

FIG. 4 shows the heatmap of the correlation across different objectives. As shown in FIG. 4, different objectives are correlated to different extent, with user centric objectives strongly positively correlated, while gender-diversity and promotion objectives are weakly negatively correlated with user centric objectives. This analysis highlights the fact that optimizing for some objectives might have a detrimental effect on other objectives. In cases where the relationship between metrics of different stakeholders are simple and correlated, optimizing one would result in gains in the other metric. But more often than not, balancing in multi-stakeholder platform entails a subtle trade-off between objectives. A recommender system built for optimizing a single metric is ill-suited in a multi-metric multi-stakeholder platform setting.

Typically, a contextual bandit model is used to optimize a single user satisfaction metric. For example, in a combinatorial contextual bandit problem, the recommender system repeatedly interacts with consumers as follows:

(1) the system observes a context (T);
(2) based on the context, the system chooses an action $a \in A$, from the space of K possible actions (sets to recommend);
(3) given a context and an action, a reward $x \in [0, 1]$ is drawn from distribution D (x|, T), with rewards in different rounds being independent, conditioned on contexts and actions.

While the context space can be infinite, composed of information the system has about user's interests, item features and other features like time, location, the action space is finite. In some embodiments, the context space includes: (i) features of the user, such as age range, gender, location, affinity to genres; (ii) features of the playlist such as its artist, its (micro and macro) genres, diversity of songs, popularity; (iii) affinity between the user and the playlist, taking into account past interactions, such as streams, skips, likes, and saves; and (iv) other contextual information, such as the day of the week and the time of day.

In some embodiments, each action is composed of selecting a set to recommend to the user. In the exemplary case of music streaming, we assume a set based recommendation strategy with the user presented with a playlist (a collection of tracks), with each track coming from specific artist.

In a traditional user-centric system, the observed reward will be based on how happy the user was with the recommendation served, and the goal of the model is to learn an arm selection strategy that maximizes user satisfaction. Such an arm selection strategy is focused on a single metric, one that is generally chosen as a proxy of user satisfaction. On the other hand, in a multi-stakeholder recommender system, vectorial rewards are observed, one corresponding to each objective, and the arm selection strategy would be decided based on the strategy that optimizes for each of these objectives. Multi-objective optimization gives us a mathematically principled solution for the trade-off among (often competing) objectives.

FIG. 4 is a block diagram showing correlations between different objectives when providing a recommended set to a user. In some embodiments, the different objectives correspond to different parties. As illustrated in FIG. 4, in some embodiments, respective objectives are conflicting (e.g., represented by a negative correlation), while other respective objectives are aligned (e.g., represented by a positive correlation, with the greatest alignment having a value of 1). In some embodiments, a system for providing the recommended set balances objectives to maximize the overall satisfaction among the different parties. In some embodiments, the recommended set comprises a list of media content items (e.g., a playlist). Thus, the system recommends a list of media content items that will provide the overall greatest satisfaction (e.g., by balancing the multiple objectives from multiple parties).

In some embodiments, the multiple parties comprise one or more of: a user, a media content provider, and an advertiser. Each of the multiple parties has one or more objectives. For example, as illustrated in FIG. 4, each axis includes a plurality of user objectives (e.g., user engagement metrics) and a plurality of objectives for a non-user (e.g., a third party). For example, the non-user comprises a stakeholder. For example, the non-user objectives comprise "diversity (g)" (e.g., representing gender diversity (of artists) present in the recommended set) and "promotion" (e.g., promotion of a particular artist and/or type of media content), while "stream" (e.g., duration of streamed media content), "clicks" (e.g., selections of playlists), "songs played" (e.g., number of media content items played), and long stream are user objectives.

In some embodiments, user objectives are determined based on previous interactions between the user and the media content provider. For example, the media content provider tracks and/or stores (e.g., in a playback history) actions (e.g., selections) made by the user. In some embodiments, the user interaction information comprises a number of clicks (e.g., a number of times a media content item is selected), a number of streams, a number of content items played (e.g., a length of a playback session), or other user engagement metrics. In some embodiments, the media content provider stores a plurality of user engagement metrics. In some embodiments, the plurality of user engagement metrics are correlated (or uncorrelated).

For example, FIG. 4 illustrates the correlation between the objectives. FIG. 4 illustrates that the user objectives tend to be positively correlated with each other, while the non-user objectives are negatively correlated with the user objectives, indicating that optimizing the selection model based on the user objectives alone does not satisfy the non-user objectives (and vice-versa). Thus, there is a trade-off between optimizing a model for user objectives or optimizing the model for non-user objectives. Accordingly, a multi-armed bandit model that accounts for the multiple objectives from multiple parties is described with reference to FIGS. 5A-5B.

Formalisms

The embodiments described herein are dynamic in that, unlike a fixed weighting between objectives, the formalism described below provides (e.g., through the use of a Gini function) an equitable allocation across objectives. In other words, the use of a Gini function results in selection of an arm that optimizes all of the objectives, such that an arm in which one objective performs very poorly is unlikely to be selected, even if that arm performs quite well in other objectives. Note that equitable allocation between objectives can be achieved on a per-round basis (e.g., by probabilistically selecting an arm that performs well on the objectives as a whole) or across several rounds. The formalism described below describes allocation between objectives on a per-round basis, but may be modified to maintain "fairness" between objectives across several rounds through the use of memory between rounds. In such cases, objectives that are doing poorly will be more likely to be promoted on the next round.

To that end, the multi-objective recommendation problem is solved in terms of a multi-arm contextual bandit setting. Assume that the bandit problem is played for a total of T rounds, where each round corresponds to a user session wherein a playlist is recommended to the user (i.e., one bandit arm is selected). For each bandit instance at round t, we are given features. For example, for each bandit instance at round t, features $f_{[t]} = (F_{[t],1}, \ldots, F_{[t],K})$ are associated with K possible arms (e.g., playlists), where $F_{[t],i} \in \mathbb{R}^M$ and M is the feature length. Such features encode the current user specific context, and may include features representing user taste profiles, historic interaction features and other contextual signals. An arm selection strategy corresponds to selecting a playlist to show to the user given observations about the contextual features in the session.

Under the linear shared model, if arm k is chosen at round t, we observe reward:

$$x_{[t]} = F_{[t],k} \vartheta^* + \xi_{[t]} \quad (1)$$

where $\vartheta^* \in \mathbb{R}^{M \times D}$ is a fixed unknown universal parameter and $\xi_{[t]} \in \mathbb{R}^D$ is an independent random noise for each objective.

A strategy is a way to pick an arm at each round by examining the features for all arms. This strategy defines which playlist (from a collection of candidate playlists) is shown to the user for each session. We can then calculate a strategy's average reward after T rounds, as $$x_{[T]} = \frac{1}{T} \Sigma_{t=1}^T x_{[t]} \quad (2)$$

In some embodiments, the scalarization approach is applied to multi-objective optimization, where one usually wants to compute the Pareto front, or search for a particular element of the Pareto front. In practice, it may be costly (and even infeasible depending on the size of the solution space) to determine all solutions of the Pareto front. One may then prefer to directly aim for a particular solution in the Pareto front. This problem is formalized as a single objective optimization problem, using an aggregation function. A Gini index based aggregation function is used, as described below.

For an aggregation function G(x), a strategy is used such that $G(\underline{x}_{[T]})$ is as large as possible, i.e., arms are selected which maximize the aggregation function. Rather than considering a strategy such that only a single arm is decided at each round, a strategy is used that, at each round, proposes a probability distribution $A = \{\alpha \in \mathbb{R}^K | \Sigma_{k=1}^K \alpha_k = 1 \wedge 0 \leq \alpha_k, \forall k \leq K\}$ according to which an arm (i.e. αk) is to be drawn. That is, mixed strategies are considered. For example an optimal mixed strategy arm selection policy can be found for a single bandit problem with known mean feedback by solving the following optimization problem:

$$\alpha^* \in \arg\max\, G(\Sigma_{k=1}^K \alpha_k \mu_{[k]}) \quad (3)$$

In other words, an arm with the highest mean reward is pulled most frequently. Nonetheless, arms with less reward values are also pulled sometimes. This allows the model to trade-off exploitation of known arms with exploration of potentially useful arms. In the single objective case, arms are compared in terms of their means, which induce a total ordering over arms. In the multi-objective setting, a specific form of aggregation criterion to compare arms is used, as described below.

The aggregation function allows the model to scalarize inputs from different objectives. In some embodiments, the generalized Gini function (GGF) is used. GGF is a non-linear but concave function. It is a special case of the ordered weighted averaging (OWA) aggregation operators, which preserves impartiality with respect to the individual criterion. For a reward vector $x = x_1 \ldots x_D$, GGF is defined as:

$$G_w(x) = \Sigma_{d=1}^D w_d (x_\sigma)_d = w^T x_\sigma \quad (4)$$

where $w_1 > w_2 > \ldots > w_d > 0$ and $\Sigma$ permutes the elements of x such that $(x_\sigma)_i \leq (x_\sigma)_{i+1}$. GCF is strictly monotonic, which means that a vector that maximizes $G_w(x)$ also lies on the Pareto front for direct optimization of the multiple criteria and different weights (w) correspond to different points on the frontier. GGF exhibits a fairness property under the Pigou-Dalton transfer: if $x_i < x_j$, then $G_w(x') > G_w(x)$ for $x'_i = x_i + \epsilon$ and $x'_j = x_j - \epsilon$ where $\epsilon < x_j - x_i$ and x'k=xk for k≠i, j. In other words, an equitable transfer of an arbitrarily small amount from a larger component to a smaller component is always preferable. The effect of such a transfer is to balance a reward vector.

Given the GGI formulation of the aggregation function, regret is defined for the multi-objective bandit model. If $\vartheta^*$ is known, then after T rounds, the optimal mixed policy $\alpha^*[t]$ is provided by a solution to the following problem:

$$\max G\left(\frac{1}{T} \Sigma_{t=1}^T \Sigma_{k=1}^K \alpha_{[t],k} F_{[t],k}\, \vartheta^*\right) \quad (5)$$

where we have assumed that random noises $\xi_{[t]}$ average out at zero for large T.

Regret is then defined as the difference between the optimal value of reward and reward from any strategy as:

$$R_{[T]} = G\left(\frac{1}{T} \Sigma_{t=1}^T \Sigma_{k=1}^K \alpha^*_{[t],k} F_{[t],k}\, \vartheta^*\right) - \\ G\left(\frac{1}{T} \Sigma_{t=1}^T \Sigma_{k=1}^K \alpha_{[t],k} F_{[t],k}\, \vartheta^*\right) \quad (6)$$

where $\alpha_{[t]}$ is the action recommended by the employed strategy.

Note that in the definition of regret, the true parameter $\vartheta^*$ is used and that performance is measured by the function value of the average reward instead of the average of the rewards' function value. The arm selection strategy presented above employs the GGF as an aggregation function to scalarize multiple metrics. Then, the parameters of the arm selection strategy given above is determined.

In some embodiments, each round of the multi-arm bandit model described above corresponds to a user session (e.g., and each arm of the multi-arm bandit model corresponds to a list of media content items of the plurality of lists of media content items). For each user session, a list of media content items (e.g., a playlist) from the plurality of lists of media content items is selected to be recommended to the user (e.g., presented via a user interface) during the user session. The respective list of media content items that is identified comprises a "bandit arm" that is selected in the respective round.

For example, one bandit arm is selected (from the probability distribution) for each session of the user. In some embodiments (e.g., in which it is desirable to present multiple playlists to a user), multiple bandit arms (e.g., each corresponding to a respective playlist) are selected for a single session of the user, by applying the methods described herein serially (e.g., selecting a first arm, than selecting a second arm, etc). In some embodiments, a user session comprises an amount of continuous time a user consumes media content from the content provider. In some embodiments, each session of the user is defined by a time period. For example, each day represents a distinct user session. In some embodiments, sessions vary in length (e.g., based on how long the user consumes media content).

Figure 5A:
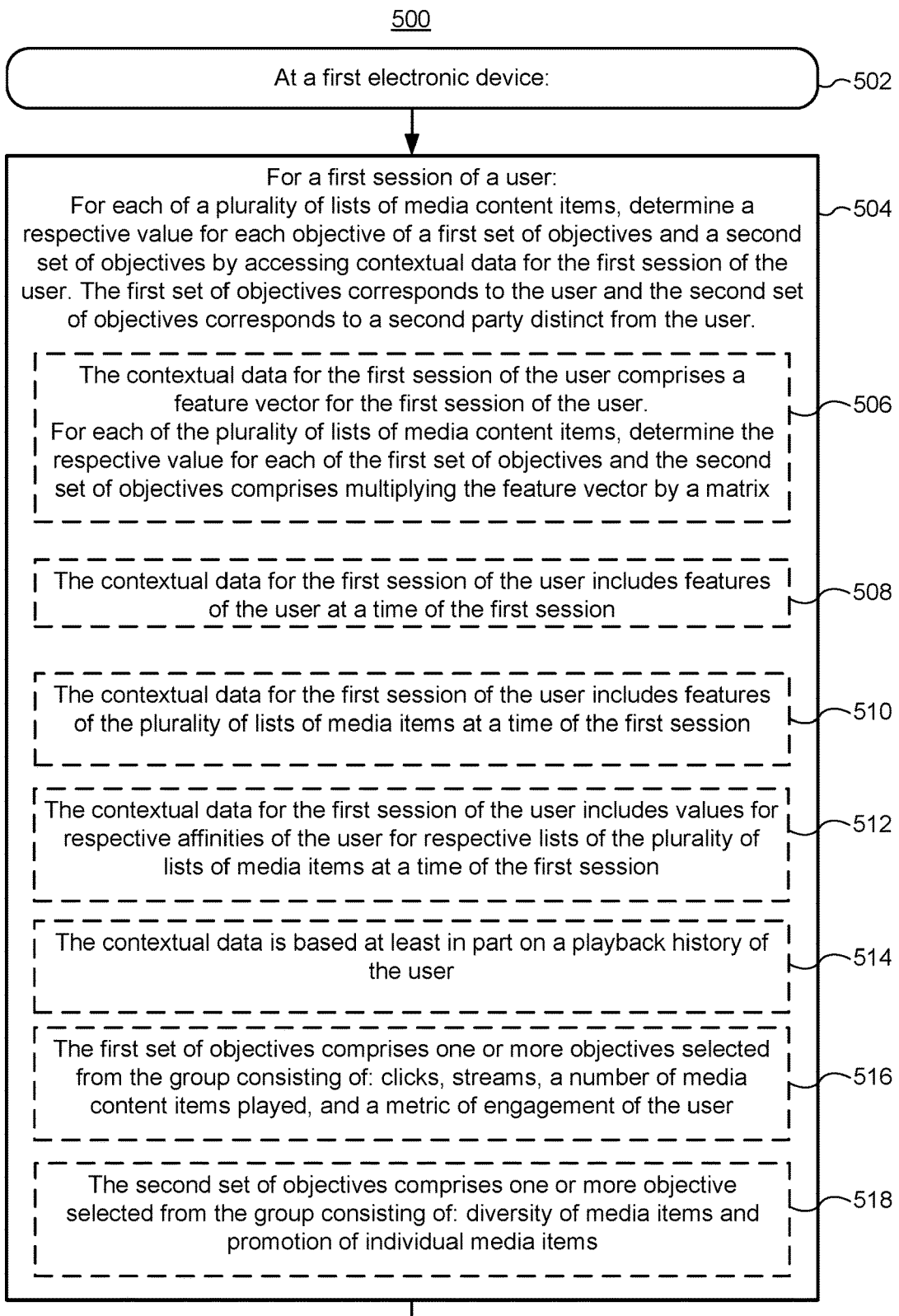
FIGS. 5A-5B are flow diagrams illustrating a method of selecting a list of media content items, in accordance with some embodiments.
Figure 5B:
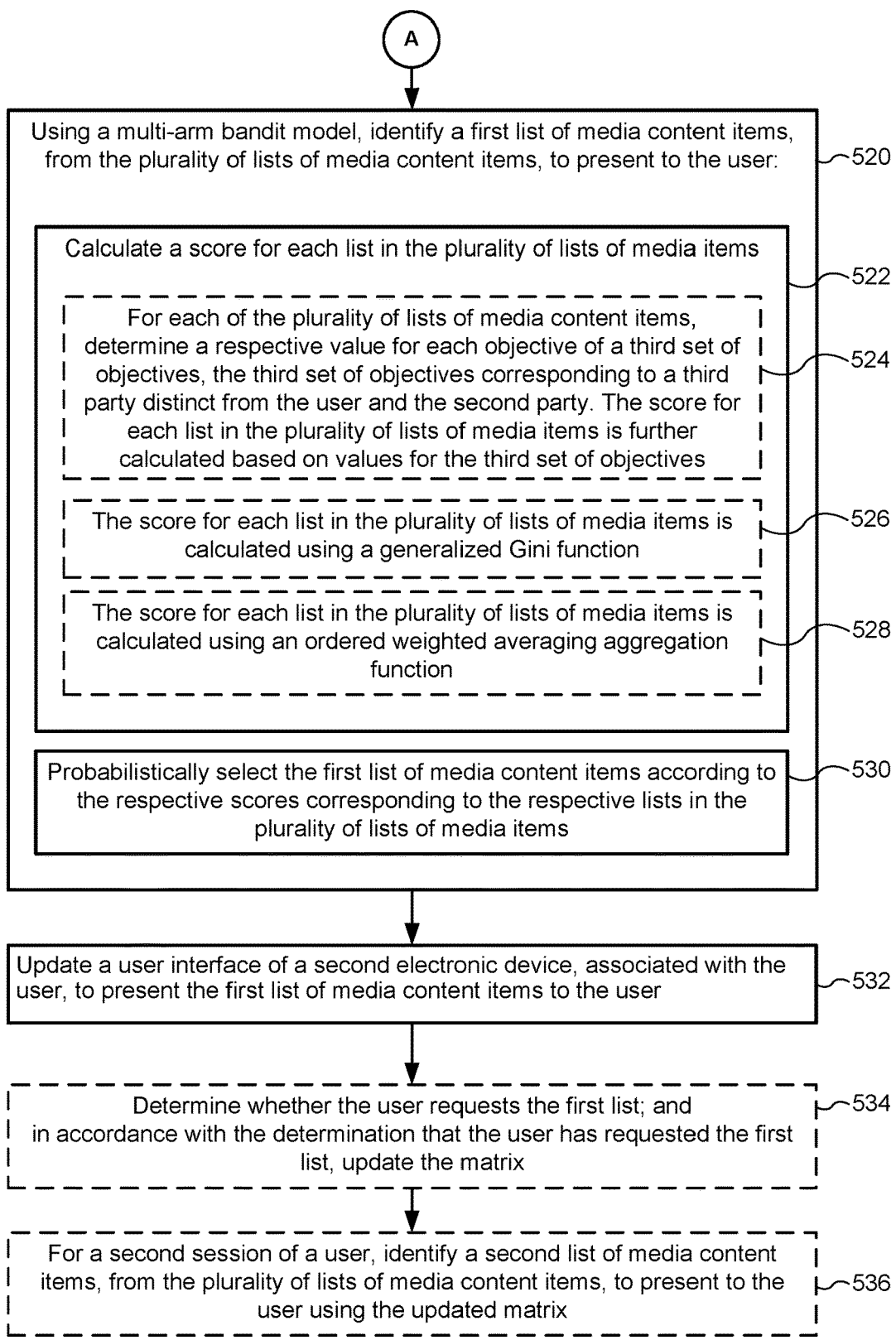

FIGS. 5A-5B are flow diagrams illustrating a method 500 for selecting a list of media content items, in accordance with some embodiments. Method 500 may be performed (502) at a first electronic device (e.g., electronic device 102-1), the electronic device having one or more processors and memory storing instructions for execution by the one or more processors. In some embodiments, the method 500 is performed by executing instructions stored in the memory (e.g., memory 212, FIG. 2) of the electronic device. In some embodiments, the method 500 is performed by a combination of the server system (e.g., including media content server 104 and CDN 106) and an electronic device (e.g., a client device). In some embodiments, the server system provides tracks (e.g., media items) for playback to the electronic device(s) 102 of the media content delivery system 100.

Referring now to FIG. 5A, in performing the method 500, the first electronic device (502), for a first session of a user, for each of a plurality of lists of media content items, determines (504) a respective value for each objective of a first set of objectives and a second set of objectives by accessing contextual data for the first session of the user (e.g., determines a vector of values for the first set of objectives and the second set of objectives, each value corresponding to a respective objective of the first set of objectives or the second set of objectives). For example, the first set of objectives and the second set of objectives is represented by a feature vector $F_{[t]}$. For example, for each session (t), a feature vector $F_{[t]}$ is defined for M features (e.g., a vector of length M). In some embodiments, the features encode the current user specific context (e.g., based on the playback history of the user). For example, the features correspond to a vector that is encoded based on the user objectives and context associated with the user. In some embodiments, the features represent user taste profiles, historic interaction of the user with media content items, and other contextual signals stored in the playback history.

For example, the value for each objective is calculated as x[t] given by equation 1. In some embodiments, the value for each objective x[t] is referred to as a reward value (explained above with reference to equation 1).

In some embodiments, the set of values for the first set of objectives and the second set of objectives form a vector. For example, the value for each objective corresponds to (is stored at) a particular position within the vector. In some embodiments, the set of objectives are described by set D in the equations above (e.g., equation 4 from d=1 to D is for every objective in the set of D objectives). In some embodiments, values for the sets of objectives (e.g., the elements of the vector) are determined by applying a feature vector (described below) for the round to the set of equations.

In some embodiments, the contextual data for the first session of the user comprises (506) a feature vector for the first session of the user. In some embodiments, for each of the plurality of lists of media content items, the first electronic device determines the respective value (e.g., x[t]) for each of the first set of objectives and the second set of objectives by multiplying the feature vector (e.g., $F_{[t]}$) by a matrix (e.g., $\vartheta^*$) as described with reference the equations above. For example, contextual data is described as a feature vector for each playlist, where the respective feature vector for each playlist comprises an M-number of features.

In some embodiments, the contextual data for the first session of the user includes (508) features of the user at a time of the first session. For example, at least a portion of the M-number of features include features describing the user. In some embodiments, the features of the user are described by a vector. For example, the contextual data includes demographic information about the user (e.g., from a user profile). In some embodiments, the contextual data includes a user taste profile. For example, information about the user (e.g., including user preferences for types of media content items) are represented by a vector describing the user. In some embodiments, the vector that describes the user is based on demographic information and/or historical information (e.g., from a playback history) of the user.

In some embodiments, the contextual data for the first session of the user includes (510) features of the plurality of lists of media items at a time of the first session. For example, at least a portion of the M-number of features include features describing the lists of media items. For example, in some embodiments, media content items within the lists of media items are described by a feature vector. For example, tempo, genre, and/or other information describing the media content item determine a feature vector (e.g., for each media content item). In some embodiments, each list of media items is described by a feature vector describing the list as a whole (e.g., based on the individual media content items within the list). For example, a list of media items is represented by a feature vector that reflects artists, genres, and/or moods of the list.

In some embodiments, the contextual data for the first session of the user includes (512) values for respective affinities of the user for respective lists of the plurality of lists of media items at a time of the first session. For example, the contextual data includes a value that describes whether the user's taste, in the current context, overlaps with media content items in the respective lists of media content items.

In some embodiments, the contextual data is based (514) at least in part on a playback history of the user. For example, at least a portion of the M-number of features are determined from the playback history of the user (e.g., contextual information, a taste profile of the user, tracked interactions of the user).

In some embodiments, after a user consumes one or more additional media content items, the one or more additional media content items are added to the playback history of the user, and the contextual data (e.g., the feature vectors, $F_{[t]}$) is updated in accordance with the updated playback history.

In some embodiments, the first set of objectives comprises (516) one or more objectives selected from the group consisting of: clicks, streams, a number of media content items played, and a metric of engagement of the user (e.g., based on a length of a session). For example, as explained above with reference to FIG. 4, the first set of objectives of the user comprise "stream", "clicks", "songs played" and "long stream." It will be understood that this set of user objectives is an example, and the first set of objectives can include additional and/or alternative objectives of the user.

In some embodiments, the second set of objectives comprises (518) one or more objectives selected from the group consisting of: diversity of media items and promotion of individual media items. In some embodiments, the second set of objectives includes an artist exposure and/or audience growth of an artist. In some embodiments, the second set of objectives are associated with a second party distinct from the user. For example, a first party corresponds to the user and the second party corresponds to the media content provider (or an affiliate of the media content provider).

The electronic device, using a multi-arm bandit model, identifies (520) a first list of media content items, from the plurality of lists of media content items, to present to the user, including calculating (522) a score for each list in the plurality of lists of media items using the respective value for each objective of the first set of objectives and the second set of objectives (e.g., by applying an aggregation function to the first vector and the second vector). In some embodiments, the score for each list in the plurality of lists of media items is a scalar value. For example, the score is calculated for each list in the plurality of lists of media content items, by calculating a value of G(x) described in Equation 4

In some embodiments, the first electronic device, for each of the plurality of lists of media content items, determines (524) a respective value (e.g., scalar value) for each objective of a third set of objectives, the third set of objectives corresponding to a third party distinct from the user and the second party, wherein the score for each list in the plurality of lists of media items is further calculated based on values for the third set of objectives (e.g., the values for the third set of objectives are included in the vector that is aggregated using an aggregation function, as described below). For example, the D objectives include objectives for the user, the second party, and the third party.

In some embodiments, the score for each list in the plurality of lists of media items is calculated (526) using a generalized Gini function. For example, equation 4 is used to calculate the score for each list. In some embodiments, the score is a scalar value.

In some embodiments, the score for each list in the plurality of lists of media items is calculated (528) using an ordered weighted averaging aggregation function. It will be understood that alternative functions can be used to determine the score for each list of media items. In some embodiments, a same function is used to determine the score for each round of the multi-arm bandit model.

In some embodiments, identifying the first list of media content items, from the plurality of lists of media content items, to present to the user, includes probabilistically selecting (530) the first list of media content items according to the respective scores corresponding to the respective lists in the plurality of lists of media items. For example, after calculating G(x) for each list in the plurality of lists of media items, the plurality of lists are arranged in a probability distribution (according to their respective scores). Then, any of the lists can be selected probabilistically (e.g., not always selecting the list with the greatest score). For example, while the list with the greatest score has a higher probability of being selected, any of the plurality of lists may be selected.

The first electronic device updates (532) a user interface of a second electronic device, associated with the user, to present the first list of media content items to the user. For example, for each session (e.g., round), the user is presented with the list of media content items (e.g., arm) probabilistically selected for the session. In some embodiments, the first electronic device and the second electronic device are the same device (e.g., an electronic device 102). In some embodiments, the first device is a server system (e.g., media content server 104) and the second device is a client device (e.g., electronic device 102).

In some embodiments, the plurality of lists of media content items are pre-downloaded to the second electronic device. For example, the plurality of lists of media content items are stored on electronic device 102, and in response to a user selecting the first list of media content items, the electronic device 102 presents media content in the first list of media content item. For example, a user selects a playlist (e.g., that is stored on the electronic device 102) and the electronic device plays back content from the playlist. In some embodiments, the plurality of lists of media content items are updated periodically (e.g., additional lists of media content items are added, removed, edited, etc.).

In some embodiments, the first electronic device determines (534) whether the user requests the first list. In some embodiments, in accordance with the determination that the user has requested the first list, the first electronic device updates the matrix (e.g., over time $\vartheta^*$ is optimized). For example, the score for each list in the plurality of lists is updated according to a reward that is determined based on whether the user actually selects (e.g., consumes) the identified list of media content items. For example, when a user selects the identified list, the model takes the selection as an indication that the probability distribution succeeded in predicting a list of media content items that satisfies the user objectives such that, over time, the matrix $\vartheta^*$ is updated based on the reward.

In some embodiments, after presenting the user with the first list of media content items, the user can choose to select (or not select) the first list of media content items. In some embodiments, the method includes predicting whether the user will select the first list of media content items that is presented to the user. For example, for each objective, the device predicts a possible action the user may take and then use the prediction as a sub-routine (e.g., using ridge regression) to update the probability distribution. In some embodiments, the probability distribution is optimized to minimize the regret (e.g., when the prediction does not match what the user actually does) for the aggregation function. In some embodiments, stochastic gradient descent is used for ridge regression. In some embodiments, a stochastic gradient ascent is used to update the parameters of the ridge regression between each round, and thus the model learns about the user. In some embodiments, each round is not based on the outcome from the previous round (e.g., arms are selected independently as the rounds progress). In some embodiments, for each round (e.g., session), the bandit model is iterated multiple times (e.g., more than once) because it does not consider the results of the previous round.

In some embodiments, in response to determining the user has requested the first list, the electronic device adds one or more media content items from the first list to the playback history of the user (e.g., when the user consumes the media content items in the first list, the electronic device updates the playback history of the user to include the consumed media content items) and updates the matrix ($\theta^*$) for the multi-arm bandit model. For example, when the user selects the first list (e.g., for consumption), the model recognizes the selection as a positive reward, and the scores for each list are re-calculated using the updated matrix values.

In some embodiments, in response to determining that the user has not requested the first list (e.g., within a first predefined time period (e.g., session)), the electronic device updates the matrix for the multi-arm bandit model (e.g., with a negative reward to the model). Thus, for each subsequent round (e.g., session), the score for each list of media items is recalculated using an updated matrix ($\theta^*$), where the matrix is updated based on the feedback of whether the user selected the media content item.

In some embodiments, the first electronic device, for a second session of a user, identifies (536) a second list of media content items, from the plurality of lists of media content items, to present to the user using the updated matrix. For example, the updated matrix results in different calculated scores for each list of the plurality of lists.

In some embodiments, for subsequent sessions, the electronic device selects a list of media content items that is distinct from the first list of media content items. For example, the system performs deduplication of the lists of media content items such that, after a user has been presented with the first list of media content items, the first list of media content items is removed from the set of possible lists of media content items to present to the user. In some embodiments, the third list of media content items is the same as the first list of media content items (e.g., without performing deduplication).

Although FIGS. 5A-5B illustrate a number of logical stages in a particular order, stages which are not order dependent may be reordered and other stages may be combined or broken out. Some reordering or other groupings not specifically mentioned will be apparent to those of ordinary skill in the art, so the ordering and groupings presented herein are not exhaustive. Moreover, it should be recognized that the stages could be implemented in hardware, firmware, software, or any combination thereof.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method comprising:
at a first electronic device of a media-providing service having one or more processors and memory storing one or more programs for execution by the first electronic device:
for a first session of a user:
for each of a plurality of lists of media content items, determining a respective value for each objective of a first set of objectives and a second set of objectives by accessing contextual data for the first session of the user, wherein the first set of objectives corresponds to the user and the second set of objectives corresponds to a second party distinct from the user, and wherein the first set of objectives is negatively correlated with the second set of objectives;
using a multi-arm bandit model to jointly optimize for the first set of objectives corresponding to the user and the second set of objectives corresponding to the second party distinct from the user, identifying a first list of media content items, from the plurality of lists of media content items, to present to the user, including:
calculating a score for each list in the plurality of lists of media content items using the respective value for each objective of the first set of objectives and the second set of objectives;
probabilistically selecting the first list of media content items according to the respective scores corresponding to the respective lists in the plurality of lists of media content items; and
updating a user interface of a second electronic device, associated with the user, to present the first list of media content items to the user.

2. The method of claim 1, wherein:
the contextual data for the first session of the user comprises a feature vector for the first session of the user; and
for each of the plurality of lists of media content items, determining the respective value for each of the first set of objectives and the second set of objectives comprises multiplying the feature vector by a matrix.

3. The method of claim 2, further comprising:
determining whether the user requests the first list; and
in accordance with the determination that the user has requested the first list, updating the matrix.

4. The method of claim 3, further comprising, for a second session of a user, identifying a second list of media content items, from the plurality of lists of media content items, to present to the user using the updated matrix.

5. The method of claim 1, further comprising, for each of the plurality of lists of media content items, determining a respective value for each objective of a third set of objectives, the third set of objectives corresponding to a third party distinct from the user and the second party, wherein the score for each list in the plurality of lists of media content items is further calculated based on values for the third set of objectives.

6. The method of claim 1, wherein the contextual data for the first session of the user includes features of the user at a time of the first session.

7. The method of claim 1, wherein the contextual data for the first session of the user includes features of the plurality of lists of media content items at a time of the first session.

8. The method of claim 1, wherein the contextual data for the first session of the user includes values for respective affinities of the user for respective lists of the plurality of lists of media content items at a time of the first session.

9. The method of claim 1, wherein the first set of objectives comprise one or more objectives selected from the group consisting of: clicks, streams, a number of media content items played, and a metric of engagement of the user.

10. The method of claim 1, wherein the second set of objectives comprises one or more objectives selected from the group consisting of: diversity of media content items and promotion of individual media content items.

11. The method of claim 1, wherein the contextual data is based at least in part on a playback history of the user.

12. The method of claim 1, wherein the score for each list in the plurality of lists of media content items is calculated using a generalized Gini function that combines the first set of objectives corresponding to the user with the second set of objectives that is negatively correlated with the first set of objectives and corresponds to the second party distinct from the user.

13. The method of claim 1, wherein the score for each list in the plurality of lists of media content items is calculated using an ordered weighted averaging aggregation function.

14. A first electronic device associated with a media-providing service, comprising:
one or more processors; and
memory storing instructions for execution by the one or more processors, the instructions including instructions for:
for a first session of a user:
for each of a plurality of lists of media content items, determining a respective value for each objective of a first set of objectives and a second set of objectives by accessing contextual data for the first session of the user, wherein the first set of objectives corresponds to the user and the second set of objectives corresponds to a second party distinct from the user, and wherein the first set of objectives is negatively correlated with the second set of objectives;
using a multi-arm bandit model to jointly optimize for the first set of objectives corresponding to the user and the second set of objectives corresponding to the second party distinct from the user, identifying a first list of media content items, from the plurality of lists of media content items, to present to the user, including:
calculating a score for each list in the plurality of lists of media content items using the respective value for each objective of the first set of objectives and the second set of objectives;
probabilistically selecting the first list of media content items according to the respective scores corresponding to the respective lists in the plurality of lists of media content items; and
updating a user interface of a second electronic device, associated with the user, to present the first list of media content items to the user.

15. A non-transitory computer readable storage medium storing one or more programs configured for execution by one or more processors of a first electronic device associated with a media-providing service, the one or more programs comprising instructions for:
for a first session of a user:
for each of a plurality of lists of media content items, determining a respective value for each objective of a first set of objectives and a second set of objectives by accessing contextual data for the first session of the user, wherein the first set of objectives corresponds to the user and the second set of objectives corresponds to a second party distinct from the user, and wherein the first set of objectives is negatively correlated with the second set of objectives;
using a multi-arm bandit model to jointly optimize for the first set of objectives corresponding to the user and the second set of objectives corresponding to the second party distinct from the user, identifying a first list of media content items, from the plurality of lists of media content items, to present to the user, including:
calculating a score for each list in the plurality of lists of media content items using the respective value for each objective of the first set of objectives and the second set of objectives;
probabilistically selecting the first list of media content items according to the respective scores corresponding to the respective lists in the plurality of lists of media content items; and
updating a user interface of a second electronic device, associated with the user, to present the first list of media content items to the user.

16. The first electronic device of claim 14, wherein:
the contextual data for the first session of the user comprises a feature vector for the first session of the user; and
for each of the plurality of lists of media content items, determining the respective value for each of the first set of objectives and the second set of objectives comprises multiplying the feature vector by a matrix.

17. The first electronic device of claim 16, further comprising:
determining whether the user requests the first list; and
in accordance with the determination that the user has requested the first list, updating the matrix.

18. The first electronic device of claim 17, further comprising, for a second session of a user, identifying a second list of media content items, from the plurality of lists of media content items, to present to the user using the updated matrix.

19. The first electronic device of claim 14, wherein the instructions further include instructions for, for each of the plurality of lists of media content items, determining a respective value for each objective of a third set of objectives, the third set of objectives corresponding to a third party distinct from the user and the second party, wherein the score for each list in the plurality of lists of media content items is further calculated based on values for the third set of objectives.

20. The first electronic device of claim 14, wherein the contextual data for the first session of the user includes features of the user at a time of the first session.

* * * * *